United States Patent [19]

Haro

[11] Patent Number: 4,771,651

[45] Date of Patent: Sep. 20, 1988

[54] FOOTSTEP FOR FREESTYLE BICYCLES

[75] Inventor: Robert B. Haro, Encinitas, Calif.

[73] Assignee: Medalist Industries, Inc., Mequon, Wis.

[21] Appl. No.: 51,656

[22] Filed: May 20, 1987

[51] Int. Cl.⁴ .............................................. G05G 1/18
[52] U.S. Cl. ...................................... 74/564; 280/291
[58] Field of Search ............... 74/564, 560, 563, 562, 74/562.5, 566; 280/291

[56] References Cited

U.S. PATENT DOCUMENTS

| 379,557 | 3/1888 | Benfield | 280/291 |
| 396,182 | 1/1889 | Walter | 280/291 |
| 402,304 | 4/1889 | Chapin | 280/291 |
| 416,696 | 12/1889 | Warwick | 280/291 |
| 450,907 | 4/1891 | Blakely | 280/291 |
| 993,567 | 5/1911 | Stickelbaut | 280/291 |
| 1,125,281 | 1/1915 | Fentress | 280/291 |
| 3,773,355 | 11/1973 | Swartz | 280/291 |
| 4,174,852 | 11/1979 | Panzica et al. | 74/564 |
| 4,591,179 | 5/1986 | Nakamura | 74/563 |
| 4,638,682 | 1/1987 | Michiyama | 74/564 |

FOREIGN PATENT DOCUMENTS

| 490327 | 1/1930 | Fed. Rep. of Germany | 280/291 |
| 588337 | 5/1925 | France | 280/291 |
| 1062222 | 4/1954 | France | 280/291 |
| 1099152 | 8/1955 | France | 280/291 |
| 1239961 | 7/1960 | France | 280/291 |
| 474881 | 10/1952 | Italy | 280/291 |
| 1062222 | 4/1954 | France | 280/291 |
| 16794 | of 1888 | United Kingdom | 280/291 |
| 28920 | of 1897 | United Kingdom | 280/291 |
| 6795 | of 1898 | United Kingdom | 280/291 |

*Primary Examiner*—Gary L. Smith
*Assistant Examiner*—Vinh Luong
*Attorney, Agent, or Firm*—Fred Flam

[57] ABSTRACT

A footstep for attachment to a bicycle component, such as a front fork, has a channel or semi-cylindrical configuration that encompasses the bicycle component when the footstep is in its retracted position. The combined lateral dimension of component and footstep is barely greater than that of the component itself whereby the footstep is out of the way. The lower end of the footstep is pivoted to the component so that it can be moved outwardly into operative position. Edges of the footstep provide spaced apart lines of contact for great stability. Weight and shock loads are directly and efficiently transmitted to the bicycle component. A small tab facilitates movement of the footstep to operative position by foot manipulation.

8 Claims, 2 Drawing Sheets

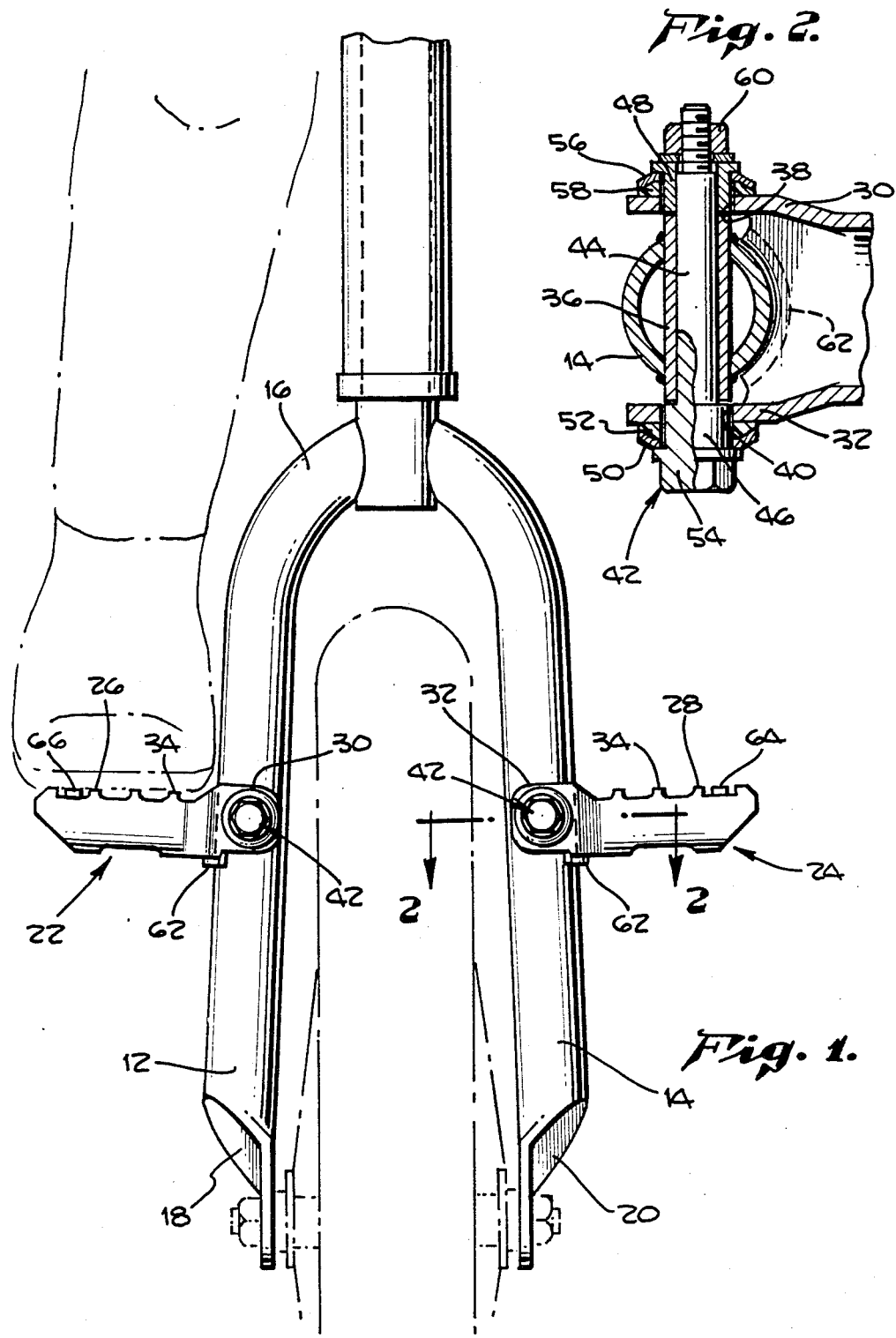

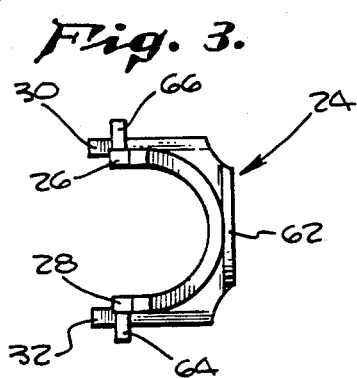
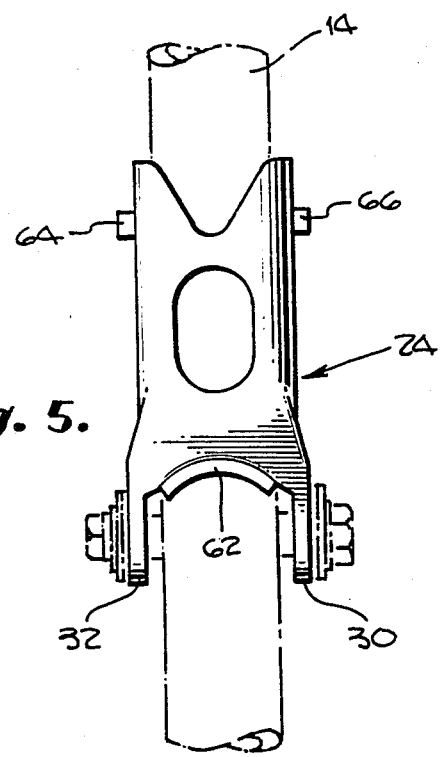
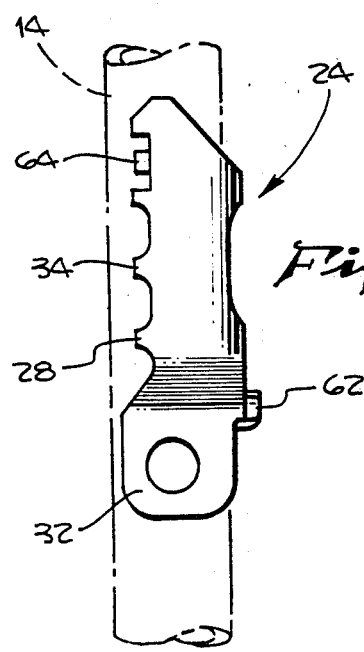
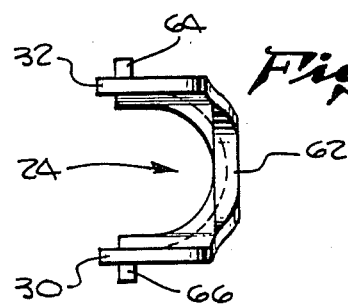
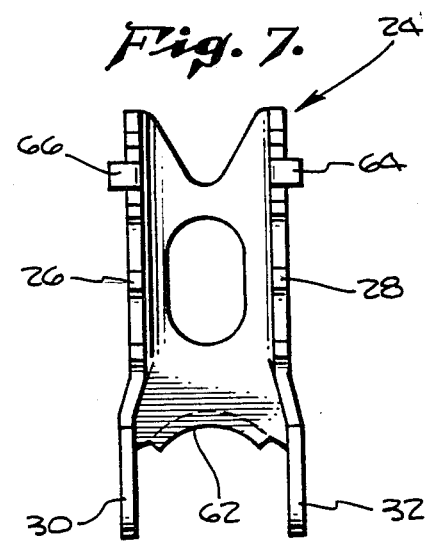

FOOTSTEP FOR FREESTYLE BICYCLES

FIELD OF INVENTION

This invention relates to freestyle bicycles, that is to say, bicycles designed for performance of various acrobatics. Such bicycles are often equipped with special attachments to facilitate certain maneuvers. One such attachment is an outwardly foldable foot support mounted at each branch of the front fork of the bicycle.

BACKGROUND OF THE INVENTION

When the freestyler is performing aerials, it is important that the foot support and all other unused attachments be retracted in order to preclude interference. Known footpegs fold, but they still occupy a significant space alongside the bicycle fork branches, which presents a hazard. An object of the present invention is to provide a simple foot support that effectively retracts.

Use of the foot support may be required for only part of the performance. When it is required, it is desirably positioned quickly and easily to minimize the discontinuities in the performance. Known foot supports generally require cumbersome operations to move them from retracted to operative position. Another object of the present invention is to provide a foot support that can be operatively positioned by a simple movement of the foot.

Many known foot supports are mere pegs which provide essentially a line contact with the shoe. A line contact is both unstable and uncomfortable. Accordingly yet another object of the present invention is to provide a retractable foot support in the nature of a step whereby wide support is provided for stability and comfort.

Known footpegs often rely upon small and weak internal stops for the purpose of supporting the acrobat's weight and shock loads. Still another object of the present invention is to provide a retractable footstep that, when operative, transmits weight and shock loads directly and effectively to the bicycle structure.

SUMMARY OF INVENTION

In order to accomplish the foregoing objectives, I provide a step that has a generally semi-cylindrical contour. Since the fork branches of freestyle bicycles are often cylindrically tubular to provide strength and stability, the step is sized to fit closely about the fork branch. A pivot pin assembly projects transversely through the bicycle fork branch and mounts the lower or inner end of the footstep. The assembly includes means to impose yielding frictional resistance to angular movement of the footstep. A small lateral projection or tab at the top of the step is easily engaged by the user's shoe to move the step into operative position. Part of the step is formed as a collar to provide a sturdy abutment that engages about the fork branch when the step is projected. Weight and shock loads are directly transmitted to sturdy bicycle components. The two long edges of the semi-cylindrical step are preferably toothed for gripping engagement with the user's shoe. These edges are spaced sufficiently to provide a stable and comfortable rest.

This invention possesses many other advantages, and has other objects which may be made more clearly apparent from a consideration of the preferred embodiment of the invention shown and described.

BRIEF DESCRIPTION OF THE DRAWINGS

A detailed description of the invention will be made with reference to the accompanying drawings wherein like numerals designate corresponding parts in the several figures. These drawings are to scale.

FIG. 1 is a front elevational view of a bicycle fork with footsteps folded outwardly into operative position. The lower leg and shoe of the user is shown in dot and dash lines.

FIG. 2 is an enlarged axial sectional view through the pivot pin assembly, and taken along a plane corresponding to line 2—2 of FIG. 1. Part of the pivot pin itself is broken away and shown in section.

FIG. 3 is a top plan view of the step itself.

FIG. 4 is a side elevational view of the step shown in its retracted position, the fork branch being shown in phantom lines.

FIG. 5 is a front elevational view of the retracted step, the fork branch being shown in phantom lines.

FIG. 6 is a bottom plan view of the step.

FIG. 7 is a rear elevational view of the step.

DETAILED DESCRIPTION OF THE PREFERRED EMBODIMENT

The following detailed description is of the best presently contemplated mode of carrying out the invention. This description is not to be taken in a limiting sense, but is made merely for purposes of illustrating the general principles of the invention, the scope of the invention being defined by the appended claims.

In FIG. 1 there is illustrated a front bicycle fork 10 of made of tubular steel or the like. The fork 10 has two branches 12 and 14 extending from a bend 16. The extremities of the branches have fittings 18 and 20 designed to connect the fork to the front wheel axle.

At about the midlength of each fork branch, identical foldable footstep 22 and 24 are provided. The footsteps may be made of forged, heavy gauge steel or the like. The basic configuration of the footstep is that of a channel or a semi-cylinder (FIGS. 3 and 6) with spaced apart longitudinal edges 26 and 28 (FIGS. 1, 4 and 7). The channel sides at one end of the footstep 24, as shown in FIGS. 5 and 7, are extended to form clevis plates 30 and 32 whereby the step 24 is pivotally connected to the fork branch 14 in a manner to be hereinafter described. When so connected, the footstep can be angularly moved from an upward retracted position (FIG. 4) to a projected operative position (FIG. 1). In the retracted position (FIG. 4), the footstep closely fits the fork branch 14 so that the combined lateral dimension of the fork branch and footstep is barely greater than that of the fork branch itself. Thus the freestyler or acrobat can perform aerials or other maneuvers that do not require the footsteps all without compromise. In the outwardly folded position of FIG. 1, the spaced apart edges 26 and 28 face upwardly to present a stable support for the foot of the user. Preferably the edges 26 and 28 are provided with notches to form teeth 34 firmly to grip the sole of the user's shoe. The step provides a stable support along two spaced apart lines of contact.

The pivot pin assembly is shown in detail in FIG. 2. A mounting sleeve 36 projects through the fork branch 14. Ends of the sleeve project slightly beyond the branch 14 and are respectively welded to the branch. The clevis plates 30 and 32 are positioned over the sleeve 36, which is sized to fit just between them. Apertures 38 and 40 in clevis plates register with the sleeve 36. A pivot pin 42 has a shank 44 that fits the sleeve. The headed end of the pin 42 has an integral collar 46 that registers with the clevis plate aperture 40 and abuts the end of the mounting sleeve. The other end of the shank mounts a separate collar 48 that registers with the clevis plate aperture 38. The collar abuts the corresponding end of the sleeve 36. Washers 50 and 52 are interposed between the head 54 of the pin and the outside of the clevis plate 32 to provide proper spacing. Washers 56 and 58 are interposed between the collar 48 and the clevis plate 30 correspondingly to provide proper spacing. A nut 60 acts upon the collar 48 draws the assembly together. A spring load is imposed upon the washers 50, 52 and 56, 58. One washer 52, 58 of each set is made of resilient plastic material, such as nylon whereby a frictional resistance is imposed upon the clevis plates yieldingly to resist movement. Thus the footsteps remain in retracted position until intentionally moved.

The end of the channel connecting portion of the between the proximal ends of the clevis plates forms a stop limiting outward movement of the step. The channel is there reinforced by a semicircular collar or rim 62 (FIGS. 3 and 5) sized to engage the fork branch 14 (FIG. 1) with a substantial area of contact. The place of contact is spaced considerably from the axis of the pivot pin assembly. The weight of the performer and the shock loads are thus directly and effectively transmitted to the sturdy fork 10. The collars 46 and 48 of the pivot pin assembly are also quite large in order to distribute the stress at the clevis apertures.

In order to position the footsteps 22 and 24, the hand can, of course be used. However, it may be desirable to move the steps into position by a pedal operation during the course of an acrobatic performance. To facilitate a smooth operation, the footstep has small lateral projections or tabs 64, 66 on opposite sides of the distal end of the footstep. These projections (FIG. 5) can easily be engaged by the shoe of the user to flip the footstep downwardly. The footstep provides a large profile for easy retraction by the foot or hand of the user.

Intending to claim all novel, useful and unobvious features and combinations of features shown and/or described, I claim:

1. A freestyle bicycle or the like having a wheel supporting fork, said fork having a branch; the combination therewith of: a footstep comprising a channel shaped member with two sides and a connecting portion therebetween, said sides providing spaced apart substantially parallel edges for double line contact with the user's shoe; said channel shaped member being sized closely to fit along said fork branch with said sides in partially encompassing relationship thereto; and means pivotally connecting one end of said member to said branch and mounting said footstep for angular movement between a retracted position in which said sides partially encompass said said fork branch, and an operative position in which said parallel edges project laterally outwardly of said branch for accessible engagement with the shoe of the user.

2. The combination as set forth in claim 1 together with tab means at the distal end of one of said channel member sides, and projecting laterally outwardly of said fork branch when said footstep is in retracted position for pedal movement of said footstep from retracted to operative position.

3. The combination as set forth in claim 1 together with means for frictionally restraining angular movement of said member.

4. The combination as set forth in claim 1 in which said fork branch is substantially cylindrical, and in which said member sides and connecting portion together are substantially semi-cylindrical in configuration closely to fit said fork branch.

5. In combination: a front bicycle fork having a pair of branches; and a footstep for each of the branches, each footstep comprising a channel shaped member with two sides and a connecting portion therebetween, said sides providing spaced apart substantially parallel edges for double line contact with the user's shoe; each of said channel shaped members being sized closely to fit along the corresponding fork branch with said sides in partially encompassing relationship thereto; and means pivotally connecting one end of each of said members to its corresponding branch and mounting said footstep for angular movement between a retracted position in which said sides partially encompass the corresponding fork branch, and an operative position in which said parallel edges project laterally outwardly of its said corresponding branch for accessible engagement with the shoe of the user.

6. The combination as set forth in claim 5 in which each of said footstep members has tab means at the distal end of one of its sides, said tab means projecting laterally outwardly of the corresponding fork branch when said footstep is in retracted position for pedal movement of said footstep from retracted to operative position.

7. The combination as set forth in claim 5 in which said footstep members are substantially semi-cylindrical in configuration; and means frictionally restraining angular movement of each of said footsteps.

8. A freestyle bicycle or the like having a wheel supporting fork, said fork having a substantially cylindrical branch; the combination therewith of: a footstep comprising a channel shaped member with two sides and a connecting portion therebetween, said sides providing spaced apart substantially parallel edges for double line contact with the user's shoe; said channel shaped member being sized closely to fit along one said fork branch with said sides in partially encompassing relationship thereto; and a pivot pin assembly extending transversely through said fork branch and pivotally connecting one end of said member to said branch, said pivot pin assembly mounting said footstep for angular movement between a retracted position in which said sides partially encompass said said fork branch, and an operative position in which said parallel edges project laterally outwardly of said branch for accessible engagement with the shoe of the user.

* * * * *